(12) United States Patent
Meaney et al.

(10) Patent No.: US 6,654,925 B1
(45) Date of Patent: Nov. 25, 2003

(54) METHOD TO DETERMINE RETRIES FOR PARALLEL ECC CORRECTION IN A PIPELINE

(75) Inventors: Patrick J. Meaney, Poughkeepsie, NY (US); Pak-kin Mak, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 438 days.

(21) Appl. No.: 09/650,153

(22) Filed: Aug. 29, 2000

(51) Int. Cl.[7] .............................................. G11C 29/00
(52) U.S. Cl. ..................... 714/763; 714/764; 711/140
(58) Field of Search ..................... 711/140, 144–145; 714/702, 718, 723, 763–764, 768, 772–773, 819

(56) References Cited

U.S. PATENT DOCUMENTS

| | | | |
|---|---|---|---|
| 5,307,356 A | 4/1994 | Fifield | 371/40.1 |
| 5,912,916 A * | 6/1999 | Wu et al. | 714/763 |
| 2002/0147722 A1 * | 10/2002 | Banerjee | 707/100 |

* cited by examiner

Primary Examiner—R. Stephen Dildine
(74) Attorney, Agent, or Firm—Lynn L. Augspurger

(57) ABSTRACT

Disclosed is an apparatus and means for searching a cache directory with full ECC support without the latency of the ECC logic on every directory search. The apparatus allows for bypassing the ECC logic in an attempt to search the directory. When a correctable error occurs which causes the search results to differ, a retry will occur with the corrected results used on the subsequent pass. This allows for the RAS characteristics of full ECC but the delay of the ECC path will only be experienced when a correctable error occurs, thus reducing average latency of the directory pipeline significantly. Disclosed is also a means for notifying the requester of a retry event and the ability to retry the search in the event that the directory is allowed to change between passes.

9 Claims, 4 Drawing Sheets

| Event | Probability |
|---|---|
| Single bit | p |
| Hit any line | 98 % |
| Adjacent line (differ by the bit that has a single bit error) | 5 % |
| False Miss (CE in hit line) | p * 0.98 / 16 = 0.061 p |
| False Hit (CE in adjacent line) | p * 0.02 * 0.05 = 0.001 p |
| Double Hit (CE in adjacent line) | p * 0.98 * 15 / 16 * 0.05 = 0.046 p |
| CE with no impact on result | 1 - p(False Miss) - p(False Hit) - p(Double Hit) = p * 0.98 * 15 / 16 * 0.95 + p * 0.02 * 0.95 = 1 - 0.061 p - 0.001 p - 0.046 p = 0.892 p |

Figure 4

METHOD TO DETERMINE RETRIES FOR PARALLEL ECC CORRECTION IN A PIPELINE

FIELD OF THE INVENTION

This invention relates to symmetrical computer systems, and particularly to an apparatus for comparing corrected data with uncorrected data in a pipeline to allow for the retry of the operation without additional pipeline delay associated with inline correction.

TRADEMARKS

S/390 and IBM are registered trademarks of International Business Machines Corporation, Armonk, N.Y., U.S.A. Other names may be registered trademarks or product names of International Business Machines Corporation or other companies.

BACKGROUND

In an SMP Computer System, there are often several levels of cache which are serviced by queues or pipelines. Because of demands for high-performance and high-bandwidth, it is vital that these pipelines are as short as possible. However, with e-commerce and worldwide trade, it is also critical to keep these SMP machines available all the time. This means that defects, such as array soft failures, need to be protected by schemes such as error correction codes (ECC). In the past, the directory, an array used to look-up cache entries within the pipeline, fed ECC logic that corrected the directory address prior to the look-up function for the cache.

However, ECC logic tends to take a long time and tends to lengthen the pipeline. Therefore, computer manufacturers sometimes trade off performance for reliability/availability.

SUMMARY OF THE INVENTION

In accordance with the preferred embodiment of the invention, the pipeline is split into two parallel pipelines after the directory array. One branch bypasses the ECC logic and begins the compare function for the look-up immediately. Since the data is most often correct, this path will be exercised most often. The other path performs the ECC function by correcting the address. Then, it does the compare for the look-up based on the corrected address.

It is very rare that a single-bit error occurs. If one does, it is very rare that the one bit will affect the compare look-up results. If the look-up results are different, the operation needs to be canceled and retried. The preferred embodiment cancels the current operation and retries the pipe pass with the corrected address and compare results supplied to the pipe. That way, the second pass can also bypass the ECC logic and the compare results are used directly, still keeping the pipeline short.

There is a rare case where the preferred embodiment allows for the directory to change between the first pass in the pipe and the retry pass. If that happens, the preferred embodiment allows for the retry of the entire pipeline since the corrected address information from the first pass is no longer valid.

These and other improvements are set forth in the following detailed description. For a better understanding of the invention with advantages and features, refer to the description and to the drawings.

DESCRIPTION OF THE DRAWINGS

FIG. 1 illustrates prior art L2 Cache pipeline; while

FIG. 2 illustrates the preferred embodiment with the error correction performed in parallel with compare circuitry used to detect and recover from a correctable error, recovery circuitry to recycle the operation, and circuitry to substitute the corrected set information during recovery; while FIG. 3 illustrates the directory compare circuitry in more detail; while FIG. 4 illustrates a table of probabilities for various directory conditions to show some of the benefits of the invention.

Our detailed description explains the preferred embodiments of our invention, together with advantages and features, by way of example with reference to the drawings.

DETAILED DESCRIPTION OF THE INVENTION

Figure 1:
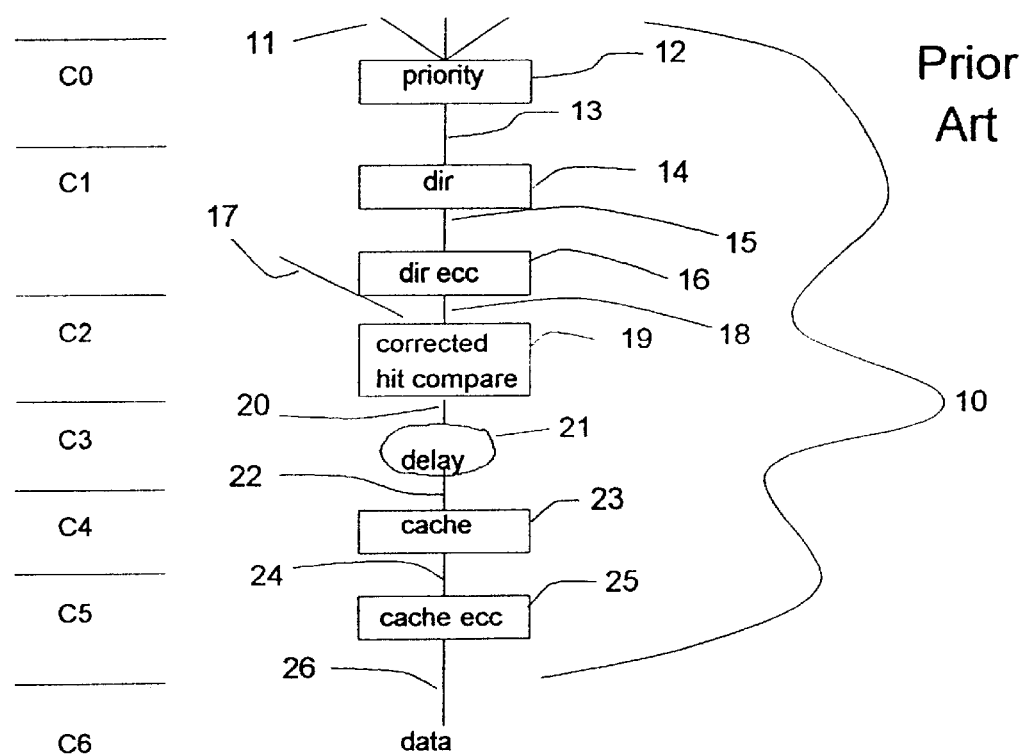

Turning to FIG. 1, notice that the prior art contains a pipeline, 10, consisting of a multiplicity of requests, 11, which get prioritized by priority logic, 12. This priority logic, 12, then selects a request for processing, 13, and accesses the directory, 14, using information from the selected request, 13. This directory consists of multiple sets or compartments which store portions of addresses to be searched.

Because the directory may have defects, the directory output address buses (one per set or compartment), 15, are connected to directory error correction code (Directory ECC) logic, 16, which corrects one or more bits of the address within each of the buses, 15, resulting in corrected address buses, 18. Normally, the address from the directory is good (ie. no errors); however, if there is a single bit error in one or more of the address buses, 15, the directory ECC logic, 16, is capable of correcting said one or more single bit errors. If there are more errors, the address is considered uncorrectable and the machine will be stopped so no further damage occurs.

The corrected directory output address buses, 18, are each compared against a supplied pipe address bus, 17, within hit compare logic, 19, in order to determine if the line would reside in the cache. If the pipe address bus, 17, compares with a particular address bus, 18, the corresponding bit of the output hit compartment bus, 20, will be made active. Based on the use of the directory, there should be no more than one bit active for a particular access. If so, the line is stored in multiple portions of the cache and the machine will be stopped because this is not an acceptable machine condition. Again, this is prior art and is generally understood by those who design cache and directory designs within computer systems.

The results of the hit compare logic, 19, are transferred to the cache, 23, via address hit compartment bus, 20, and can experience some transfer delay, 21, prior to arriving as the input late select hit compartment bus, 22, of said cache, 23. This late select hit compartment bus, 22, is used to access the data, 24, from the cache, 23, which is corrected by cache ECC logic, 25, and is available for use on bus 26, by the central processor.

In the prior art, the directory output address bus, 15, had to be corrected prior to comparing it to the pipe address, 17. This is because if there is a bit that is wrong in the directory output address bus, 15, the compare results could be incorrect. This would cause the incorrect data to be returned to the central processor, causing a data integrity problem.

Therefore, the pipeline cannot bypass the directory ECC logic, 16, without causing hit results to possibly be wrong.

The invention is used to bypass the large delay associated with inline ECC logic, 16, and allows for a recovery scheme to allow the pipeline to be shorter, thus providing higher performance. Please note that given a very high rate of correctable errors, the overall operation may be longer due to the multiple passes through the pipeline. However, it can be assumed that error events are rare enough that this is not a concern.

Figure 2:
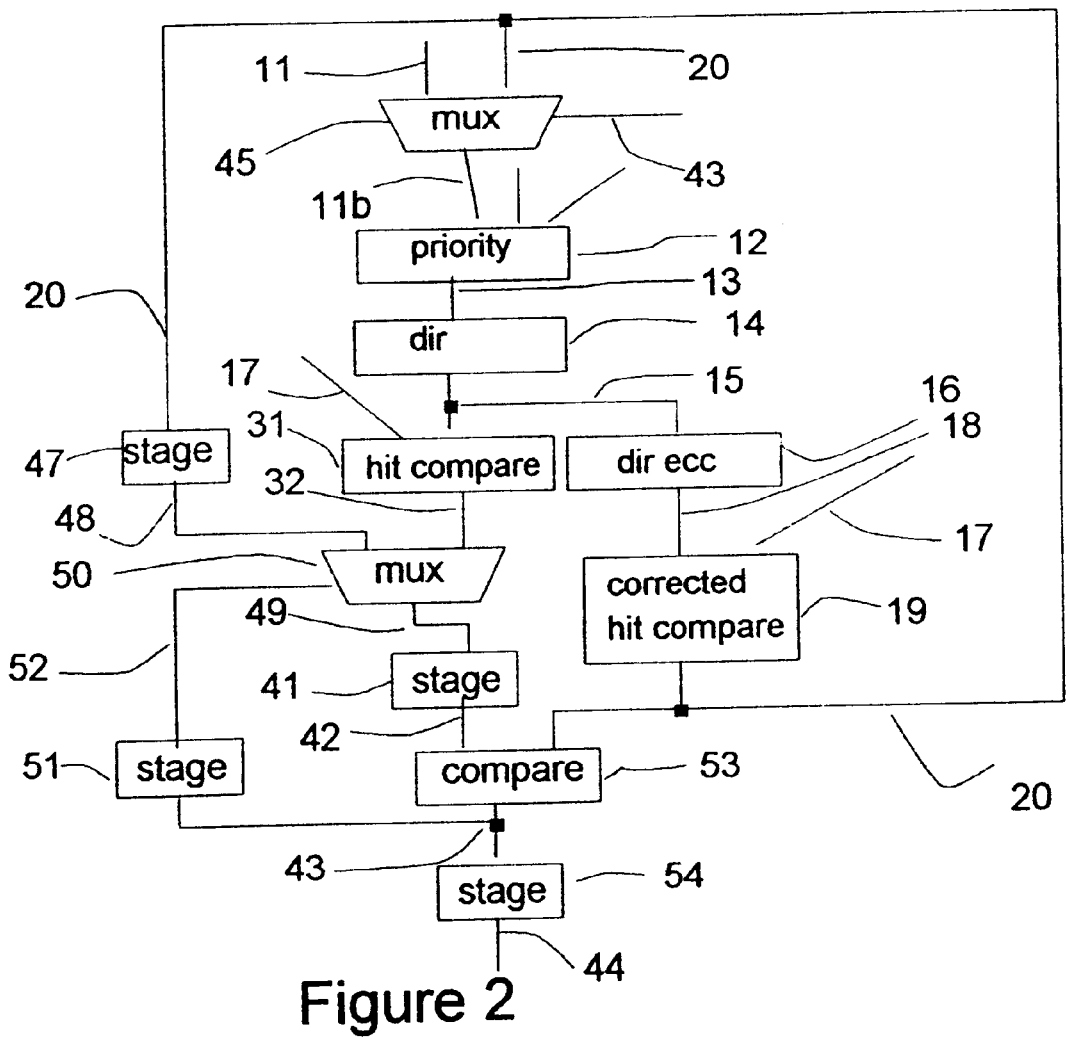

The invention is described in FIG. 2. Turning to FIG. 2, notice that the invention, unlike the prior art, includes hit compare logic, 31, which is identical in structure to prior art hit compare logic, 19. Said hit compare logic, 31, compares pipe address bus, 17, with each directory address output bus, 15, and generates new uncorrected hit compare bus, 32, which may or may not match corrected hit compare bus, 20, depending on whether errors were present.

The uncorrected hit compare bus, 32, passes through retry compare mux, 50, to create hit compartment bus 49. The retry compare mux, 50, is described later in more detail.

The hit compartment bus, 49 is staged using staging logic, 41, to generate staged hit bus, 42, which is compared to original corrected hit bus, 20, using hit bus compare logic, 53, to create hit bus compare signal 43. This hit bus compare signal, 43, is inactive when hit buses 20 and 42 compare and is active when the two buses differ. The buses should always match if there are no errors in the directory access or if the errors do not cause a change in the compare results. There is more discussion later about the significance of comparing the hit buses rather than simply indicating an error occurred.

The results of the hit compartment bus, 49, are transferred to the cache, 23, via some typical packaging delay, 21, prior to arriving as the uncorrected input late select hit compartment bus, 33, of said cache, 23. This uncorrected late select hit compartment bus, 33, is used to access the data, 34, from the cache, 23, which is corrected by cache ECC logic, 25, and is transferred to the central processor on data bus, 35. The hit bus compare signal, 43, is staged in staging logic, 54, to create signal, 44, which is used to notify the central processor that the data bus, 35, may be in error and that a retry of the data fetch will occur.

When a retry occurs, the hit bus compare signal, 43, feeds select input of retry mux, 45, which selects between original request, 11, and new retry request containing corrected hit compartment bus results, 20, thus creating a modified request bus, 11b, which feeds priority logic, 12 from the prior art. Also, for a retry, the hit bus compare signal, 43, is staged using stage logic, 51, to create staged hit bus compare signal, 52. The hit compartment bus, 20, which contains the hit results of the corrected directory information, is staged using stage logic, 47, to create staged corrected hit compartment bus, 48. When the appropriate cycle of the pipe occurs for this modified retry request, the staged hit bus compare signal, 52, will select staged corrected hit compartment bus, 48, instead of the uncorrected hit bus, 32, onto hit compartment bus, 49, using retry compare mux, 50. From there, the operation continues to access the cache. Since the corrected hit bus, 20, was the source of this second pass of the pipe, it should compare with the corrected hit bus, 20, in the current pass through the pipe. Therefore, hit bus compare signal, 43, is normally inactive during this second pass, thus allowing the CP to fetch data from the cache without a reject.

There is a rare case where the preferred embodiment allows for the directory to be updated by another request in the pipe. In order to handle this, the preferred embodiment allows for the hit bus compare signal, 43, to reject the second pass through the pipe. This is done by allowing the original request, 11, back into the pipe to start the sequence all over again.

The other elements in FIG. 2 are identical to those described in FIG. 1 and have, therefore, already been discussed.

Figure 3:
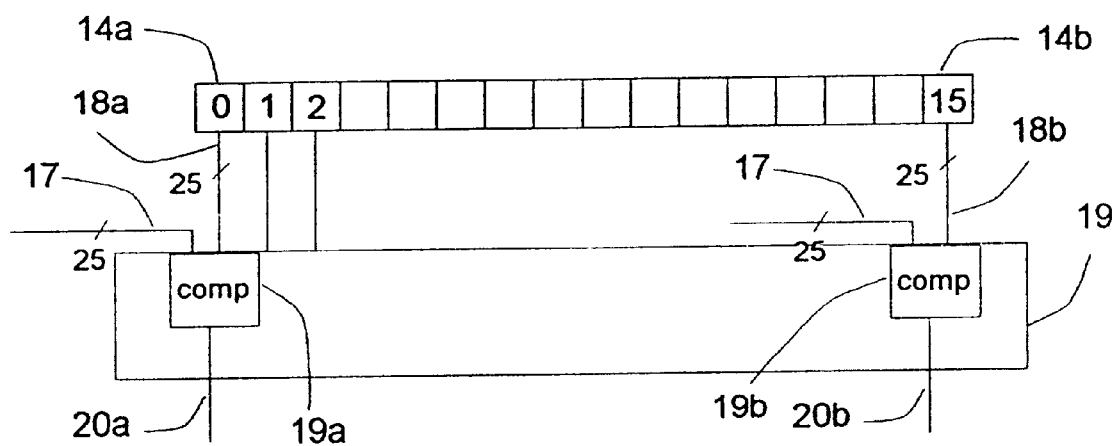

Turning to FIG. 3, the preferred embodiment shows said directory, 14, made up of elements 14a and 14b by example. Element 14a is used to access directory output address bus, 18a while element 14b is used to access directory output address bus, 18b, etc. Each directory output address bus, 18a, which in the preferred embodiment is 25 bits wide, is compared against the pipe address bus, 17, also, 25 bits in length. This comparison is done via a compare element, 19a, a component of compare logic, 19, which generates a hit bit, 20a, which is a bit of hit bus, 20. This structure was used in the prior art as well as the preferred embodiment, but will be used to illustrate that there are 16 compartments or sets. Each set acts as independent sources for compare logic to comprise an output hit bus.

Turning to FIG. 4, there is a table to help illustrate the relative probabilities of defects which helps to illustrate the usefulness of the invention. Assume that a single bit correctable error (CE) has a probability of p of occurring. Also assume that the probability of hitting in a line is 98% based on the system structure of the cache. Also assume that there is a 5% chance that a line in the cache being searched differs from the requested pipe address by the failing bit (which would cause a false hit). Given true random addresses and failing single bits, this probability would be much less. However, since programs tend to be more structured, we are assuming a 5% probability.

The probability of getting a false miss is approximately equal to the probability of a hit times the probability that the CE occurred in that compartment, $(0.98)*\frac{1}{16}$ or 0.061 p.

The probability of getting a false hit (due to a miss condition with a CE making a line appear to hit) would be p*0.02*0.05 0.001 p.

The probability of a correctable double hit (due to a hit that has an adjacent line hit due to a CE) would be $p*0.98*\frac{15}{16}*0.05=0.046$ p.

The probability of getting a CE that has no impact on the results of the hit bus are shown as 1−(<p_false_miss>+<p_false_hit>+<p_double_hit>). This result indicates that about 89% of the CEs occurring do not even require a recovery/retry action because the hit results are unaffected.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. In an SMP computer system having with a pipeline with priority queue for selecting one of a plurality of pipeline requests, a directory for looking up cache lines, and logic for detecting and recovering from errors, the method of determining retries, comprising the steps of:

a) detecting errors and providing a correction of data from the output of said directory;

b) comparing said correction of data using a supplied pipeline address to determine corrected cache set location, and c) in parallel with and concurrently with a) and b), performing the step of:

d) comparing said output of said directory, without said correction, using the said supplied pipeline address to determine uncorrected cache set location;

and then, after completion of step b) and step d), performing the steps of:

e) comparing said corrected cache set location with said uncorrected cache set to determine if a selected one of said pipeline requests should be retried.

2. The method according to claim 1, further comprising the steps of:

canceling the said selected one of said pipeline requests, and recycling one of said pipeline requests back into the priority logic to implement a retry of the operation.

3. The method according to claim 2, further comprising the step of:

notifying the requester that a cancellation has occurred.

4. The method according to claim 2, further comprising the step of:

replacing said uncorrected cache set location with said corrected cache set location during the retry, thus creating a replaced corrected set location.

5. The method according to claim 4, wherein said step of replacing said uncorrected cache set location with said corrected cache set location is accomplished using a MUX.

6. The method according to claim 2, wherein said step of recycling one of said pipeline requests back into the priority logic is accomplished using a MUX.

7. The method according to claim 4, further comprising the step of:

comparing said corrected cache set location with said replaced corrected set location on said retry of the operation to determine if the said one of a plurality of requests needs to be restarted.

8. The method according to claim 7, further comprising the steps of:

canceling the said retry of the operation, and restarting said one of said pipeline requests back in the priority logic.

9. In an SMP computer system having with a pipeline with priority queue for selecting one of a plurality of pipeline requests, a directory for looking up cache lines, and logic for detecting and recovering from errors, the method of determining retries, comprising the steps of:

a) detecting errors and providing a correction of data from the output of said directory, b) comparing said correction of data using a supplied pipeline address to determine corrected cache set location, and c) in parallel with and concurrently with a) and b), performing the step of:

d) detecting whether said output of said directory contains errors, to determine if a selected one of said pipeline requests should be retried.

* * * * *